US012486703B2

(12) United States Patent
Metzger et al.

(10) Patent No.: US 12,486,703 B2
(45) Date of Patent: Dec. 2, 2025

(54) WINDOW OR DOOR WITH A PRECISELY CONTROLLING, BUT FLEXIBLY USABLE, SASH STOP MECHANISM

(71) Applicant: Roto Frank Fenster—und Tuertechnologie Gmbh, Leinfelden-Echterdingen (DE)

(72) Inventors: Michael Metzger, Waldenbuch (DE); Stefan Fingerle, Reutlingen-Rommelsbach (DE); Martin Krebs, St. Johann (DE); Ulrich Pfeiffer, Hemmingen (DE)

(73) Assignee: Roto Frank Fenster—und Tuertechnologie GmbH, Leinfelden-Echterdingen (DE)

( * ) Notice: Subject to any disclaimer, the term of this patent is extended or adjusted under 35 U.S.C. 154(b) by 0 days.

(21) Appl. No.: 18/744,683

(22) Filed: Jun. 16, 2024

(65) Prior Publication Data

US 2024/0337145 A1 Oct. 10, 2024

Related U.S. Application Data

(63) Continuation of application No. PCT/EP2022/087045, filed on Dec. 20, 2022.

(30) Foreign Application Priority Data

Dec. 23, 2021 (DE) ..................... 10 2021 214 993.6

(51) Int. Cl.

| | |
|---|---|
| ***E05D 15/06*** | (2006.01) |
| ***E05D 7/00*** | (2006.01) |
| ***E05F 15/00*** | (2015.01) |

(52) U.S. Cl.

CPC ....... *E05D 15/0665* (2013.01); *E05D 7/0009* (2013.01); *E05D 15/063* (2013.01);

(Continued)

(58) Field of Classification Search

CPC ... E05D 15/063; E05D 15/0665; E05D 15/10; E05D 2015/1039

See application file for complete search history.

(56) References Cited

U.S. PATENT DOCUMENTS 5,836,111 A * 11/1998 Tak .......................... E05D 15/10 49/176
10,077,594 B2 * 9/2018 Fingerle ................ E05B 65/087

(Continued)

FOREIGN PATENT DOCUMENTS

AT 364272 B 10/1981
CN 207080075 U 3/2018

(Continued)

*Primary Examiner* — Marcus Menezes

(74) *Attorney, Agent, or Firm* — Orbit IP, LLP; Marc G. Martino

(57) ABSTRACT

A window or a door has a fixed frame and a sash movable relative to the fixed frame. The sash is supported on a running rail of the fixed frame via at least one carriage with at least one roller. The sash can be moved transversely/perpendicularly to the main plane of the fixed frame by a control arm, wherein a roller part of the carriage moves in a straight line with respect to a sash part of the carriage. The control arm is supported on the fixed frame via the roller of the roller part and/or via a support part. The control arm is actuated by the longitudinal movement of a drive rod, the movement imparted via a pin, which is guided in a slot. The slot guides the pin on both sides with both control flanks, except for the play necessary to move the pin in the slot.

14 Claims, 6 Drawing Sheets

(52) U.S. Cl.
CPC ......... *E05F 15/00* (2013.01); *E05Y 2201/624* (2013.01); *E05Y 2201/684* (2013.01); *E05Y 2900/132* (2013.01); *E05Y 2900/148* (2013.01)

(56) References Cited

U.S. PATENT DOCUMENTS

| | | | | |
|---|---|---|---|---|
| 11,199,044 | B2 | 12/2021 | Li et al. | |
| 2021/0404246 | A1* | 12/2021 | Lee | E05D 15/56 |

FOREIGN PATENT DOCUMENTS

| | | | |
|---|---|---|---|
| DE | 2 227 735 | A1 | 2/1973 |
| DE | 77 00 410 | U1 | 8/1978 |
| DE | 29 41 109 | A1 | 4/1981 |
| DE | 20 2008 007 829 | U1 | 8/2008 |
| DE | 10 2012 213 786 | B3 | 10/2013 |
| DE | 10 2012 213 782 | A1 | 2/2014 |
| DE | 11 2011 103 610 | B4 | 12/2017 |
| DE | 10 2016 121 709 | A1 | 5/2018 |
| DE | 20 2018 006 113 | U1 | 4/2019 |
| EP | 2 829 679 | B1 | 2/2017 |
| EP | 3 431 692 | B1 | 7/2020 |
| KR | 10-1335198 | B1 | 11/2013 |
| WO | 93/18261 | A1 | 9/1993 |
| WO | 99/60239 | A1 | 11/1999 |
| WO | 2011/100788 | A1 | 8/2011 |
| WO | 2012/057540 | A1 | 5/2012 |
| WO | 2018/218928 | A1 | 12/2018 |
| WO | 2021/149873 | A1 | 7/2021 |

* cited by examiner

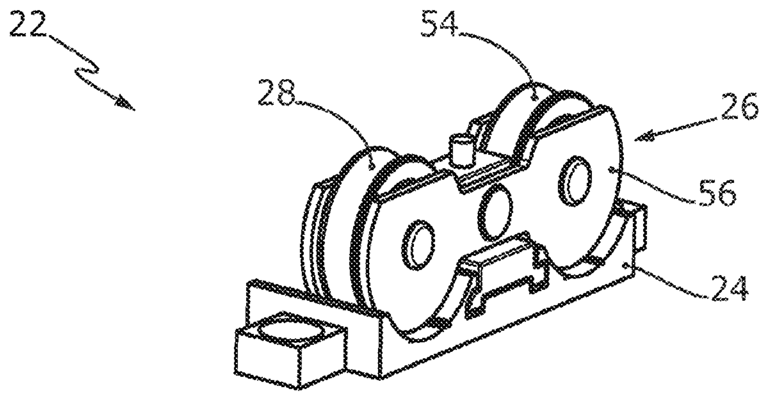
Fig. 1b
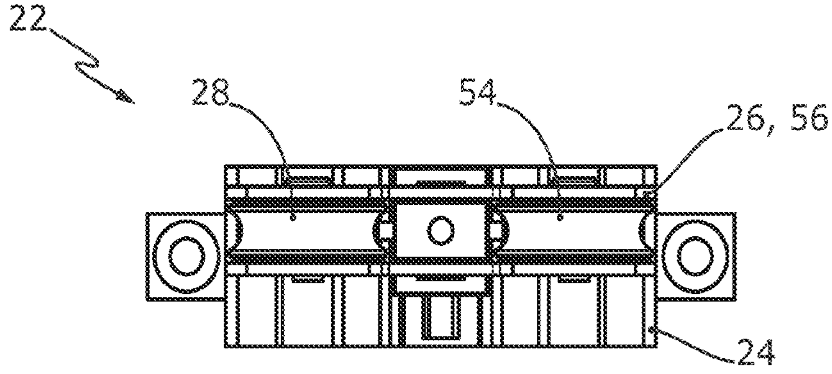
Fig. 1c
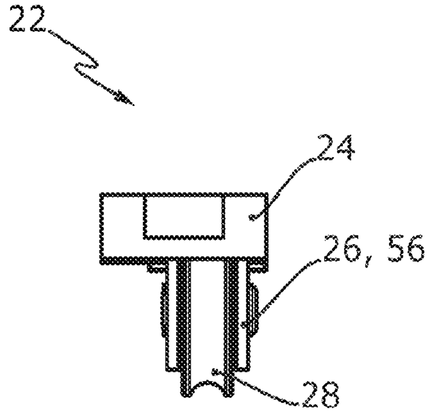
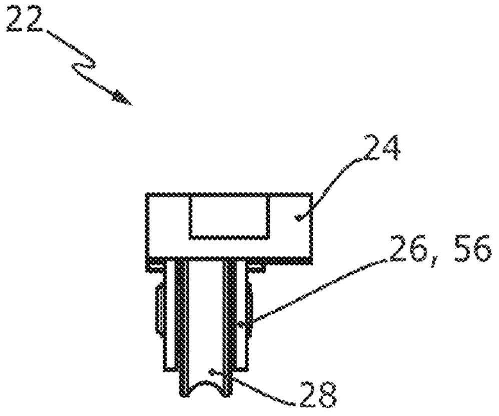
Fig. 1d
Fig. 1e

WINDOW OR DOOR WITH A PRECISELY CONTROLLING, BUT FLEXIBLY USABLE, SASH STOP MECHANISM

CROSS-REFERENCE TO RELATED APPLICATIONS

This continuation application claims priority to PCT/EP2022/087045 filed on Dec. 20, 2022 which has published as WO 2023/118177 A1 and also the German application number 10 2021 214 993.6 filed on Dec. 23, 2021, the entire contents of which are fully incorporated herein with these references.

FIELD OF THE INVENTION

The invention relates to a window or a door according to the preamble of claim 1.

BACKGROUND OF THE INVENTION

WO 93/18261 A1 discloses a sliding door whose rollers can be pivoted about the axis of a running rail. This prevents the transfer of very high sash loads. The fittings of the sliding door cannot be arranged flexibly.

DE 77 00 410 U1 discloses a sliding door having a sash that can be detached from a fixed frame of the sliding door. To detach the sash, the sash is pivoted over a carriage on the sliding door. In order to transfer the load on the sash, solid bushings must be provided due to the leverage required to pivot the sash. A flexible arrangement of the fittings of the sliding door is not possible.

Carriages with a sash part that can be fixed to a sash and a roller part that can be moved in a straight line to the sash part are known from DE 10 2012 213 786 B3 and EP 2 829 679 B1.

EP 3 431 692 B1 discloses a generic door. A control arm ("support means 22") of this door can only be moved in one direction. This means that one sash of the door can only be moved with little control relative to a fixed frame of the door. Furthermore, the door fittings cannot be arranged flexibly.

SUMMARY OF THE INVENTION

Object of the Invention

It is therefore an object of the invention to provide a window or a door whose sash is precisely guided in a structurally simple manner and whose fittings can be flexibly arranged on different sash profiles in order to allow for individually constructed windows or doors.

Description of the Invention

This object is achieved according to the invention by a window or a door according to claim 1. The dependent claims reflect preferred developments.

The object according to the invention is thus achieved by a window or a door having:

A) a running rail;

B) a carriage with at least one roller on the running rail, the carriage having a sash part fixed to the sash and a roller part with the roller, wherein the roller part is movable in a straight line relative to the sash part, the movement being able to take place in a direction transverse, in particular, perpendicular, to the running rail in order to detach the sash from the fixed frame and move it towards the fixed frame;

C) a drive rod in a first groove of the sash;

D) a control arm which is supported directly or indirectly on the fixed frame in order to transmit forces for detaching the sash from the fixed frame as well as forces for pulling the sash towards the fixed frame from the sash to the fixed frame;

E) at least one slot and at least one pin guided in the slot, the control arm having a slot and the drive rod having a pin and/or the control arm having a pin and the drive rod having a slot, wherein the slot has control flanks on both sides in order to achieve both slot actuation of the pin (or pin actuation of the slot) when the sash is detached from the fixed frame in a positively controlled manner and when the sash is pulled towards the fixed frame in a positively controlled manner.

The window or door is characterized by a high degree of flexibility and can be implemented with a wide variety of sash sizes and sash profiles. Furthermore, the linear movements of the roller part in combination with the positively controlled slot on both sides guarantee a particularly precise movement of the sash from or to the fixed frame.

The terms "above," "below," "horizontal," "vertical," and the like refer to the assembled state of the window in a building.

In a particularly preferred embodiment of the window or door, the control arm is arranged on a horizontal sash beam. The control arm is preferably supported on the fixed frame horizontally and/or perpendicular to the main plane of the fixed frame. A plurality, in particular, any number, of control arms can be arranged on a horizontal sash beam. The multiple control arms can be designed to be identical.

Preferably, the control arm has the slot and the drive rod has the pin guided in the slot. This allows the drive rod to be made the same width throughout, which further simplifies the construction of the window or door.

The slot defines a recess, preferably in the form of a through-recess. The slot can completely enclose the recess.

The control flanks extend in particular, on both sides of the movement path of the pin in the slot.

The roller part can have an additional roller to enable the carriage to run more smoothly and to transfer a greater load.

The sash may have a handle for operating the drive rod. The movement of the handle can be transmitted to the drive rod by a gear of the sash.

Further preferably, the first groove is formed with the drive rod on the underside of the sash.

Any threshold that may be present is considered part of the fixed frame.

In a particularly preferred embodiment of the invention, the control arm is connected to the roller part by means of a connector. The connector enables positive control of the roller part via the drive rod, so that the sash is guided in a particularly controlled and precise manner.

The connector can be cranked and/or angled.

Particularly preferably, the connector is designed to transmit both compressive forces and tensile forces between the roller part and the control arm.

The connector may have a hinge. The connector preferably has multiple hinges.

The hinge can be designed in the form of a stiff-back chain for transmitting compressive and tensile forces.

The connector may comprise multiple tab-shaped elements connected via one or more hinges.

In a further preferred embodiment of the connector, it has an adjustment option so that the ends of the connector, which are arranged on the control arm or roller part, can be adjusted vertically and/or horizontally relative to one another. This allows the control arm and carriage to be arranged particularly flexibly on different profiles for sashes or fixed frames.

The connector may be designed to have multiple parts. Two parts of the connector can be locked together in different positions, either detachably or non-detachably. Two parts of the connector can be pluggable and/or clipped. Two parts of the connector can be connected in a form-fitting manner. The parts that can be locked together in different positions can be made of spring steel.

The connector can have multiple through-recesses for variably receiving of a pin for adjusting the connector.

Alternatively or additionally, the connector may have an adjustment option at one end or at both ends. The connection of the connector to the control arm and/or the roller part may have an adjustment option.

In order to divert forces for detaching the sash from the fixed frame and for pulling the sash towards the fixed frame into the fixed frame, a support part can be arranged or formed on the control arm which is supported directly on the fixed frame, in particular, not on the running rail. The support part is preferably in the form of a roller and/or is finger-shaped. The roller can be mounted, in particular, with a roller bearing, to facilitate the detachment the sash from or the pulling of the sash towards the fixed frame. The support part preferably extends perpendicular to the main plane of the control arm.

The carriage can have a projection on both longitudinal sides of the running rail to prevent the carriage from derailing in the event of heavy sash loads transverse to the main plane of the sash or fixed frame. These projections are particularly advantageous if no support part is used.

The control arm can be pivotally mounted on the sash. Preferably, the control arm is pivotally mounted on a face-plate of the sash.

The roller part can be arranged and/or aligned parallel to the first groove. Preferably, the carriage is arranged parallel to the first groove.

The sash can have a second groove which runs at least in sections, in particular, predominantly, preferably completely, parallel to the first groove, wherein the carriage is arranged in the second groove. The second groove preferably runs at least along the underside of the sash.

The carriage can be arranged flush with the control arm on the sash in order to achieve a particularly space-saving arrangement of the carriage.

The window or door may have an additional carriage which is arranged next to the carriage in relation to the extension of the drive rod. The additional carriage may have a roller part with a roller. The roller part of the additional carriage can be coupled to the roller part of the carriage. The additional carriage can be constructed identically to the carriage.

Alternatively or additionally, a carriage can have multiple roller parts. The roller parts can be arranged next to one another with respect to the extension of the drive rod.

One or more roller parts can be coupled to the control arm by a connector and thus be positively controlled.

In addition to the features described here, the sash may have, on its upper side, an upper side drive rod in an upper side groove of the sash and an upper side control arm which is movable by the upper side drive rod, wherein the upper side control arm is supported directly or indirectly on the fixed frame in order to convey both forces for detaching the sash from the fixed frame and forces for pulling the sash towards the fixed frame from the sash to the fixed frame. Multiple, in particular, any number of, upper side control arms can be arranged on the upper side of the sash.

The first groove is preferably formed circumferentially, so that the upper side groove represents a portion of the first groove.

The upper side drive rod can be designed to be identical to, or a mirror image of, the drive rod. Alternatively or additionally, the upper side control arm can be designed to be identical to, or a mirror image of, the control arm.

The upper side control arm can be supported on the fixed frame via an upper side support part. The upper side support part can be constructed identically to the support part. Preferably, the upper side support part is in the form of a roller and/or is finger shaped.

In an independent aspect of the invention, the invention further relates to a fitting arrangement with a carriage with a roller that is movable on a running rail, the carriage having a sash part that can be mounted on a sash of a window or door and a roller part having the roller, wherein the roller part is movable transversely, in particular, perpendicularly, to the running rail in a straight line relative to the sash part in order to move the sash towards a fixed frame of the window or door or away from the fixed frame, wherein the fitting arrangement has an actuatable drive rod that can be guided in a first groove of the sash, the fitting arrangement having a control arm that can be supported directly or indirectly on the fixed frame, wherein the fitting arrangement has a slot on the control arm and a pin guided in the slot on the drive rod and/or a slot on the drive rod and a pin guided in the slot on the control arm, the slot having control flanks on both sides in its longitudinal direction, so that a displacement of the pin in the slot in a first direction can cause the sash to be detached from the fixed frame in a positively controlled manner and a displacement of the pin in the slot in the second direction opposite to the first direction can cause the sash to be pulled towards the fixed frame in a positively controlled manner.

The fitting arrangement can have all the features and variants described here for the window or door.

Further advantages of the invention can be found in the description and the drawings. Likewise, according to the invention, the aforementioned features and those which are to be explained below can each be used individually or together in any desired combinations. The embodiments shown and described are not to be understood as an exhaustive list, but, rather, have an exemplary character for the description of the invention.

BRIEF DESCRIPTION OF THE DRAWINGS

FIG. 1*b* shows an isometric view of a carriage of the door from FIG. 1*a*, wherein the carriage is rotated by 180° for illustration purposes.

FIG. 1*c* shows a bottom view of the carriage from FIG. 1*b*.

FIG. 1*d* shows a front view of the carriage from FIGS. 1*a* to 1*c*.

FIG. 1*e* shows a front view of the carriage from FIG. 1*d*, wherein the sash has been moved transversely to the extension of a running rail on which the carriage can be moved.

DETAILED DESCRIPTION OF EMBODIMENTS OF THE INVENTION

Figure 1A:
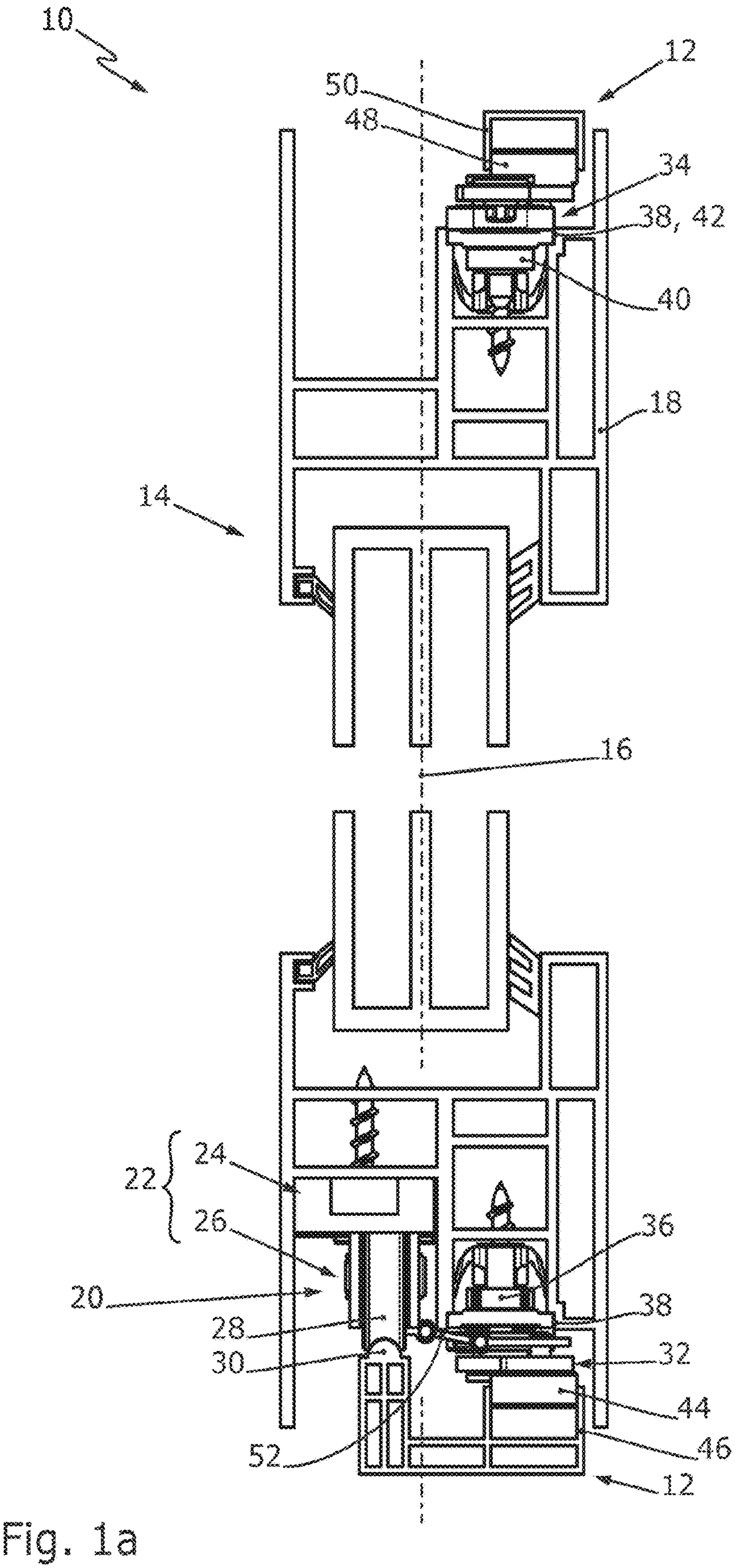
FIG. 1*a* shows a sectional view of a first embodiment of a sliding door with a fixed frame and a sash movable transversely and parallel to the main plane of the fixed frame.

FIG. 1*a* shows a door 10 with a fixed frame 12 and a sash 14. The sash 14 is slidable parallel to an indicated central main plane 16 of the fixed frame 12 in order to open and close the sash 14, i.e., to open or cover a main opening of the fixed frame 12.

The sash 14 has a sash profile 18 on which a fitting arrangement 20 is installed. The fitting arrangement 20 allows the sash 14 to move relative to the fixed frame 12. The fitting arrangement 20 is provided at least on the underside of the sash 14, in the present case at least on the underside and the upper side of the sash 14.

A carriage 22 is provided for moving the sash 14 parallel to the central main plane 16. The carriage 22 has a sash part 24 and a roller part 26 with a roller 28. The roller 28 runs on a running rail 30 of the fixed frame 12.

The sash 14 can be locked to the fixed frame 12, in particular, to latching elements not shown here. For locking, the sash 14 can be moved transversely, in particular, perpendicularly, to the extension of the running rail 30 towards the fixed frame 12. To unlock the sash 14, the sash 14 can be moved ("detached") from the fixed frame 12 transversely, in particular, perpendicularly, to the extension of the running rail 30 away from the fixed frame 12. To achieve this movement of the sash 14 transversely to the extension of the running rail 30, a control arm 32, in the present case a control arm 32 and an upper side control arm 34, is provided. The upper side control arm 34 can be constructed identically to or as a mirror image of the control arm 32. Preferably, two control arms and two upper side control arms are provided to evenly position the entire sash 14. Optionally, at least one additional control arm and/or one additional upper side control arm may be provided. Additional control arms/additional upper side control arms may be provided to press the sash 14 evenly and tightly against the fixed frame 12.

The control arm 32 is actuated by a drive rod 36. The drive rod 36 runs in a first groove 38 of the sash profile 18. The upper side control arm 34 is actuated by an upper side drive rod 40. Since the first groove 38 in the present case is formed circumferentially on the sash profile 18, the section of the first groove 38 on the upper side of the sash 14 represents an upper side groove 42.

The control arm 32 is supported on the fixed frame 12 by a support part 44. The support part 44 is supported directly on the fixed frame 12. It is designed in the form of a roller. The support part 44 can be guided in a guide groove 46 of the fixed frame 12. The support part 44 preferably extends transversely, in particular, perpendicularly to the main plane of the control arm 32.

The upper side control arm 34 is supported on the fixed frame 12 by an upper side support part 48. The upper side support part 48 is supported directly on the fixed frame 12. It is designed in the form of a roller. Preferably, the upper side support part 48 is constructed identically to the support part 44. The upper side support part 48 can be guided in an upper side guide groove 50 of the fixed frame 12.

The control arm 32 is still supported on the fixed frame 12 via the roller 28 on the running rail 30. For this purpose, the roller part 26 is connected to the control arm 32 via a connector 52.

FIGS. 1*b* to 1*e* show views of the carriage 22, from which it can be seen that the roller part 26 can be moved straight, i.e., without curvature, with respect to the sash part 24 (see, in particular, FIGS. 1*d* and 1*e*). In the present case, the roller part 26 has an additional roller 54 in addition to the roller 28. The rollers 28, 54 are arranged in a roller cage 56.

Figure 1F:
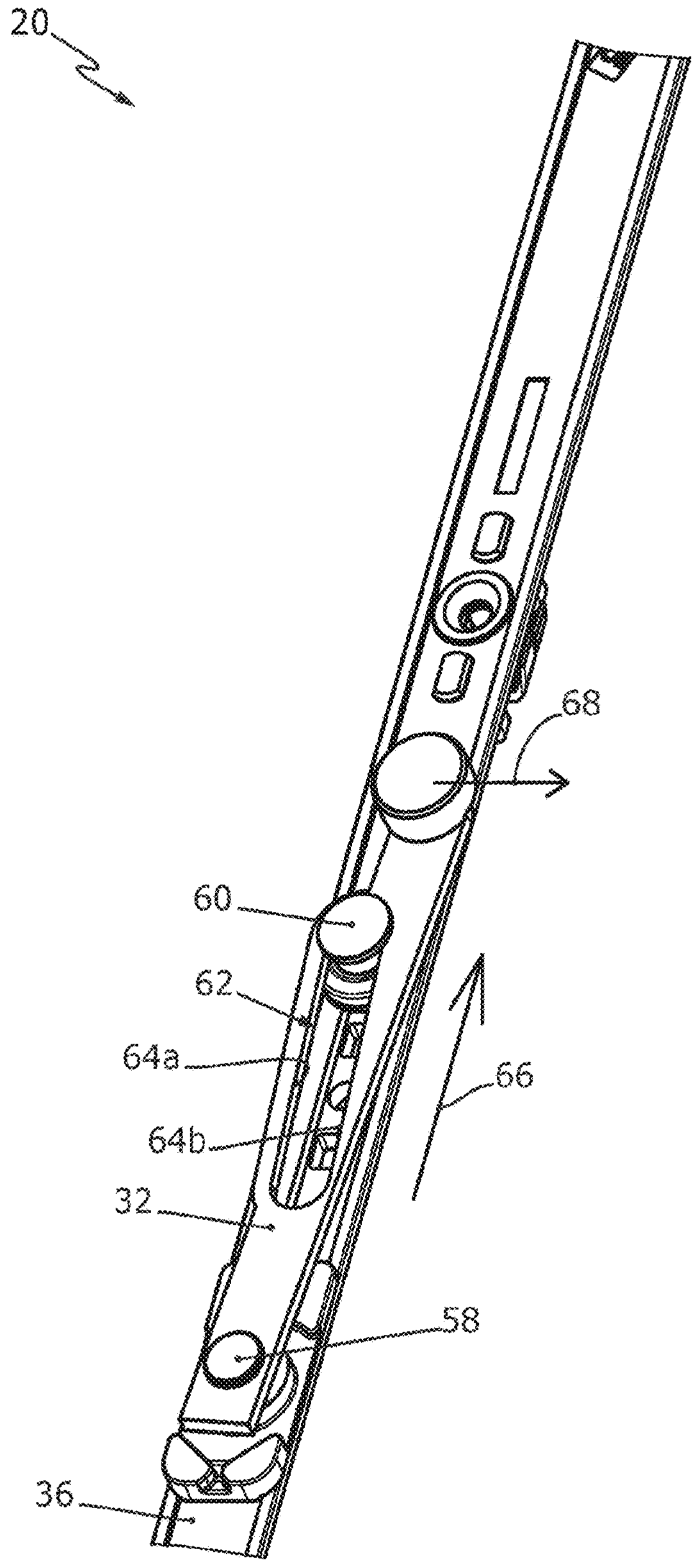
FIG. 1*f* shows an isometric view of a control arm for moving the sash transversely to the extension of the running rail.

FIG. 1*f* shows a part of the fitting arrangement 20 with the control arm 32, which can be actuated by the drive rod 36. The control arm 32 can be pivoted with respect to the drive rod 36 via a bearing 58. A pin 60 is attached to the drive rod 36 and is guided in a slot 62 of the control arm 32. The slot 62 has control flanks 64*a*, 64*b* on both sides in its extension (i.e., its direction of extension). These control flanks 64*a,b* enable both a positively controlled, guided pivoting out of the control arm 32 and a positively controlled, guided pivoting in of the control arm 32.

If the drive rod 36 is moved with the pin 60 in a first direction 66, the control arm 32 pivots out in the direction of an arrow 68. This preferably corresponds to detaching the sash 14 (see FIG. 1*a*) from the fixed frame 12 (see FIG. 1*a*). If, on the other hand, the pin 60 is moved in the opposite direction ("second direction;" not shown), the control arm 32 pivots in the opposite direction of the arrow 68. This preferably corresponds to closing/locking or pulling the sash 14 (see FIG. 1*a*) towards the fixed frame 12 (see FIG. 1*a*). The pin 60 can be mushroom-head-shaped to guide the control arm 32.

Figure 1G:
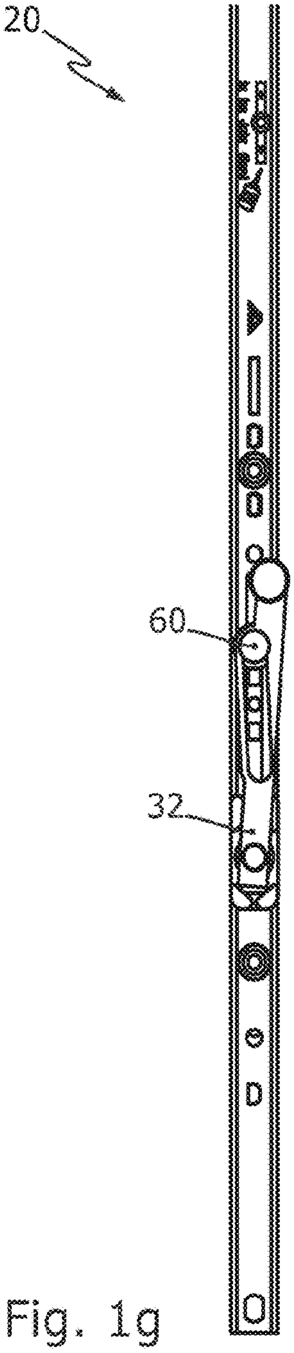
FIG. 1*g* shows a plan view of the control arm from FIG. 1*f*.
Figure 1I:
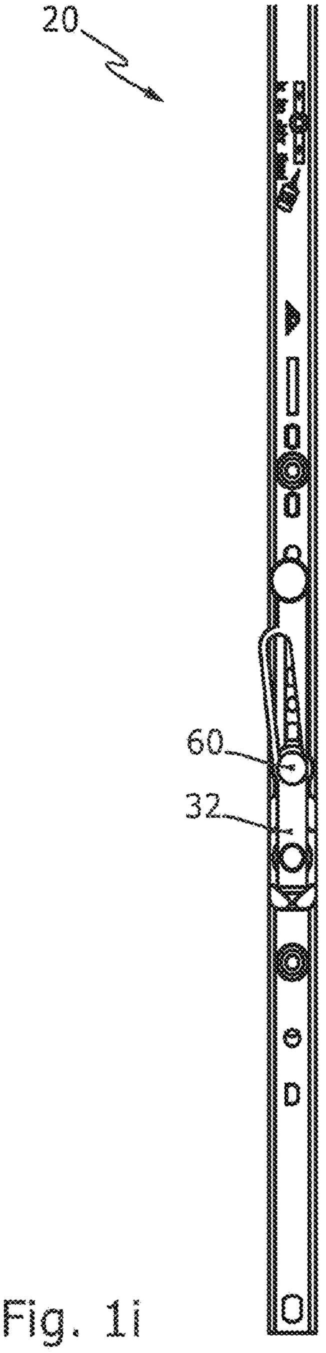
FIG. 1*i* shows a plan view of the control arm from FIG. 1*g*, wherein the sash has been moved transversely to the extension of the running rail.
Figure 1H:
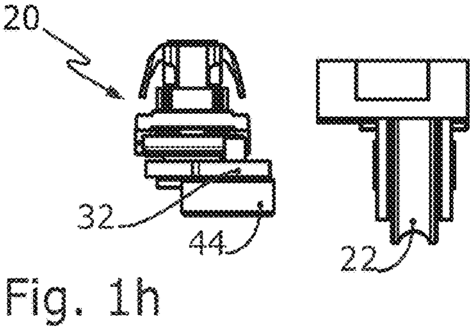
FIG. 1*h* shows an enlarged front view of the control arm and a support part actuated by the control arm as well as the carriage.
Figure 1J:
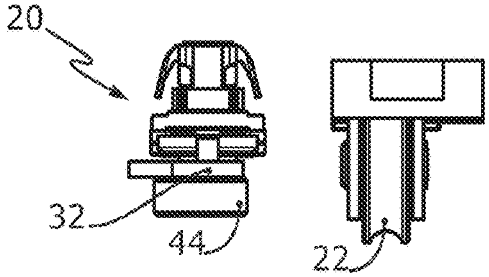
FIG. 1*j* shows an enlarged front view of the control arm, the support part and the carriage from FIG. 1*h*, according to the position of the control arm from FIG. 1*i*.

FIGS. 1*g* to 1*j* show this movement of the control arm 32 of the fitting arrangement 20. FIG. 1*g* is a plan view of the control arm 32, FIG. 1*h* is a corresponding front view of the control arm 32 with the support part 44 and the carriage 22 in a first position of the pin 60. FIG. 1*i* is a plan view of the control arm 32, FIG. 1*j* is a corresponding front view of the control arm 32 with the support part 44 and the carriage 22 in a second position of the pin 60.

Figure 1K:
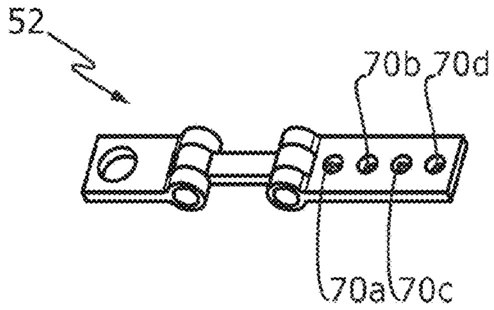
FIG. 1*k* shows an isometric view of a connector for connecting a roller part of the carriage to the control arm.
Figure 1L:
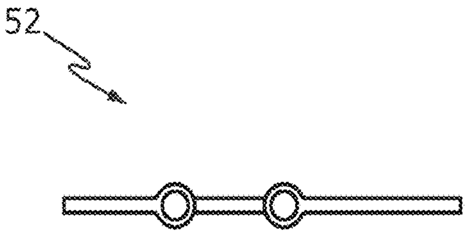
FIG. 1*l* shows a side view of the connector from FIG. 1*k*.

FIGS. 1*k* and 1*l* show the connector 52 for positive control of the roller part 26 (see FIGS. 1*a* to 1*e*). The connector 52 has multiple through-recesses 70*a*, 70*b*, 70*c*, 70*d* for variably receiving a pin (not shown). The through-recesses 70*a-d* allow adjustment of the length of the connector 52.

Figure 1M:
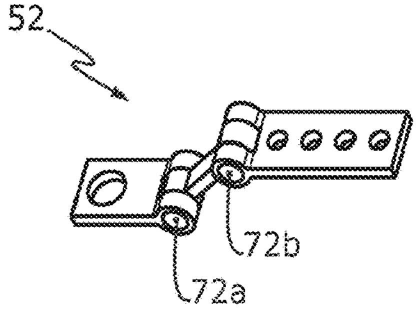
FIG. 1*m* shows an isometric view of the connector from FIG. 1*k*, wherein the ends of the connector have been adjusted relative to one another.
Figure 1N:
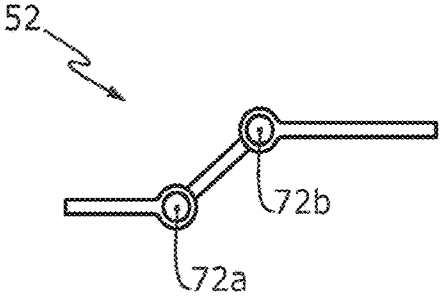
FIG. 1*n* shows a side view of the connector from FIG. 1*m*.

FIGS. 1*m* and 1*n* show the connector 52 according to FIGS. 1*k* and 1*l*. From a combination of FIGS. 1*k* to 1*n*, it can be seen that the connector 52 has two hinges 72*a*, 72*b*, so that the ends of the connector 52 (seen in the longitudinal direction of the connector 52) are adjustable both horizontally and vertically relative to one another.

Figure 2:
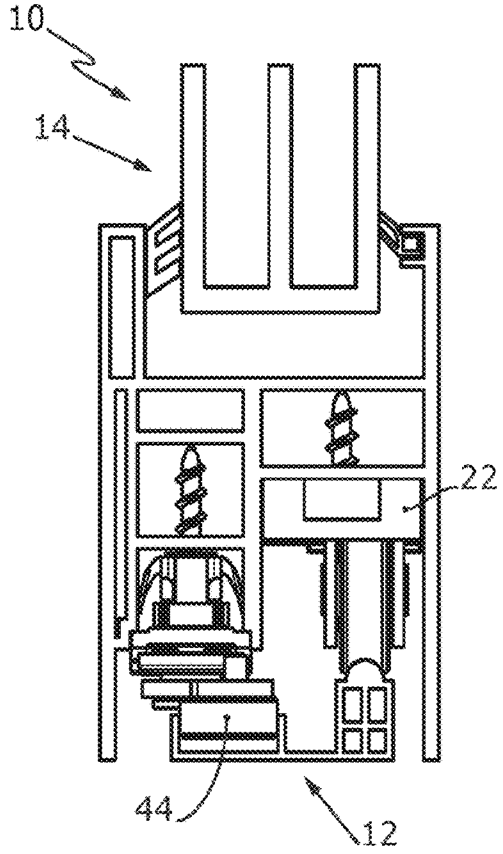
FIG. 2 shows a sectional view of further embodiment of a door with a control arm, a support part and a carriage, wherein the carriage is not positively controlled by the control arm.

FIG. 2 shows a further embodiment of a door 10, in which the positive control for opening and closing a sash 14 from a fixed frame 12 or to a fixed frame 12 is carried out via a support part 44. A connector (see connector 52 according to FIG. 1*a*) for controlling the carriage 22 is not provided.

Figure 3:
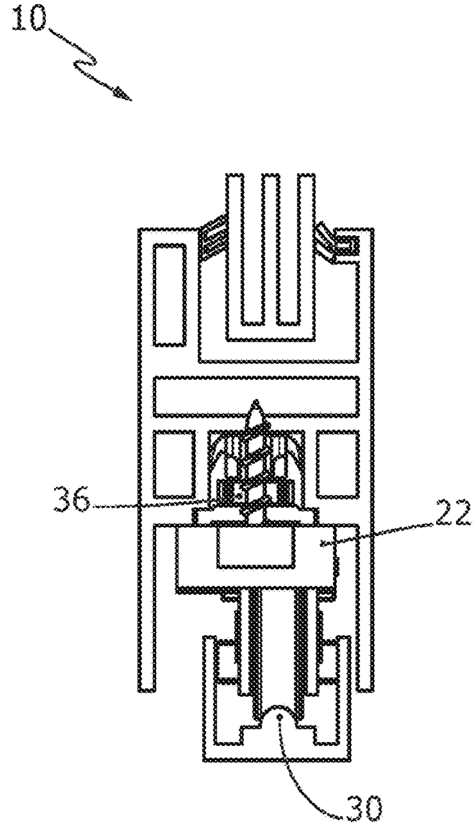
FIG. 3 shows a sectional view of a further embodiment of a door with a control arm and a carriage, wherein the carriage and "adjustment unit"/control arm are arranged one behind the other in a row.

FIG. 3 shows a further embodiment of a door 10, in which a carriage 22 is arranged parallel to the extension of a running rail 30, offset in the direction of extension of the running rail 30, behind a control arm controlled by a drive rod 36 (not shown, see control arm 32 according to FIGS. 1*f* to 1*i*).

Figure 4:
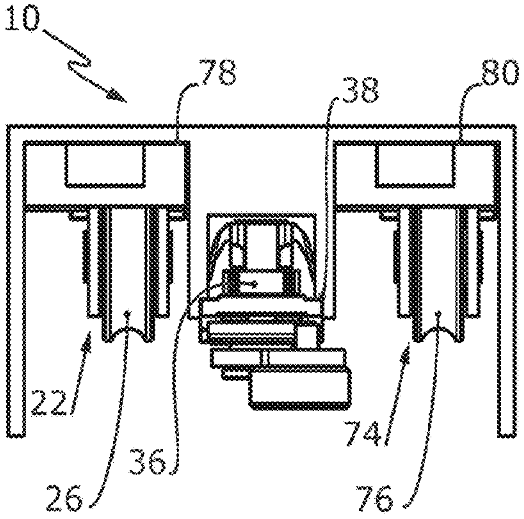
FIG. 4 shows a sectional view of a further embodiment of a door with a control arm, a carriage and an additional carriage, wherein the carriages are arranged transversely to the extension of a drive rod on both sides of the control arm.

FIG. 4 shows a door 10 in which a carriage 22 with a roller part 26 and an additional carriage 74 with an additional roller part 76 are provided on the underside of a sash 14. The carriages 22, 74 are arranged next to one another, parallel to the extension of a drive rod 36. The carriages 22, 74 are arranged on different sides of the drive rod 36. The drive rod 36 runs in a first groove 38. The carriage 22 is arranged in a second groove 78. The additional carriage 74 is arranged in a third groove 80. The roller parts 26, 76 can—as in the present case—not be positively controlled or can be articulated by corresponding connectors (see connector 52 according to FIGS. 1*k* to 1*n*).

Figure 5:
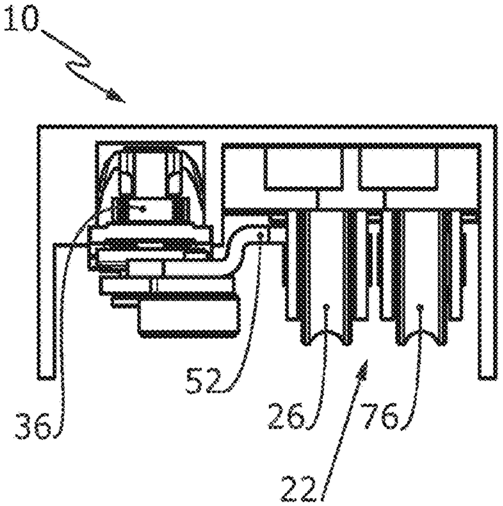
FIG. 5 shows a sectional view of a further embodiment of a door with a control arm, a carriage and an additional carriage, wherein the carriages are arranged transversely to the extension of a drive rod on the same side of the control arm.

FIG. 5 shows a door 10 with a carriage 22 with a roller part 26 and an additional roller part 76. The roller parts 26, 76 are arranged next to one another, parallel to the extension of a drive rod 36. One roller part 26 or both roller parts 26, 76, generally speaking multiple roller parts 26, 76, can be positively controlled by one or more connectors 52.

Figure 6:
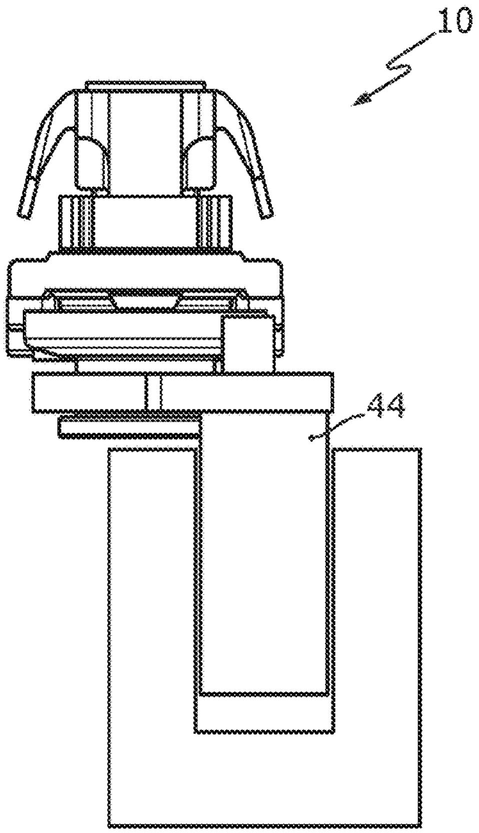
FIG. 6 shows a sectional view of a further embodiment of a door with a control arm and a finger-shaped support part arranged on the control arm.

FIG. 6 shows an embodiment of a door 10 in which a support part 44 is finger shaped.

Figure 7:
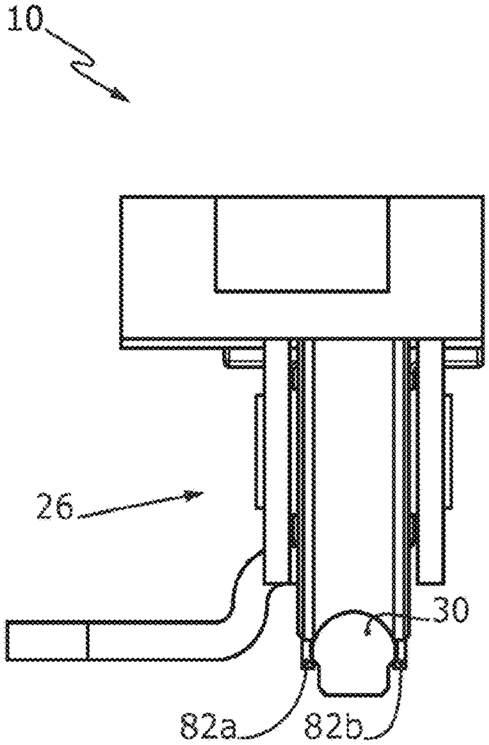
FIG. 7 shows a sectional view of a further embodiment of a door with a carriage, wherein the carriage has projections for holding the carriage on a running rail under heavy loads.

FIG. 7 shows an embodiment of a door 10 in which a roller part 26 has projections 82*a*, 82*b* in order to hold the roller part 26 on the running rail 30 even under heavy loads transversely to the extension of a running rail 30.

When viewing all the figures of the drawing in combination, the invention relates to a window or a door 10. The window or door 10 has a fixed frame 12 and a sash 14 movable relative to the fixed frame 12. The sash 14 is supported on a running rail 30 of the fixed frame 12 via at least one carriage 22 with respectively at least one roller 28. The sash 14 can be moved transversely, in particular, perpendicularly to the main plane 16 of the fixed frame 12 by a control arm 32, wherein a roller part 26 of the carriage 22 moves in a straight line with respect to a sash part 24 of the carriage 22. The control arm 32 is supported on the fixed frame 12 via the roller 28 of the roller part 26 and/or via a support part 44. The control arm 32 is preferably actuated by the longitudinal movement of a drive rod 36, wherein the movement is imparted via a pin 60 which is guided in a slot 62. The slot 62 guides the pin 60 on both sides with both control flanks 64*a,b*, except for the play necessary to move the pin 60 in the slot 62.

LIST OF REFERENCE SIGNS

10 Door
12 Fixed frame
14 Sash
16 Main plane of the fixed frame 12
18 Sash profile
20 Fitting arrangement
22 Carriage
24 Sash part
26 Roller part
28 Running roller
30 Running rail
32 Control arm
34 Upper side control arm
36 Driving bar
38 First groove
40 Upper side drive rod
42 Upper side groove
44 Support part
46 Guide groove
48 Upper side support part
50 Upper side guide groove
52 Connector
54 Additional roller
56 Roller cage
58 Bearing
60 Pin
62 Slot
64*a,b* Control flank
66 First direction
68 Arrow (shows pivoting of the control arm 32)
70*a-d* Through-recess
72*a,b* Hinge
74 Additional carriage
76 Additional roller part
78 Second groove
80 Third groove
82*a,b* Projection

What is claimed is:

1. A window or a door having a fixed frame and a sash movable relative to the fixed frame, wherein the window or the door comprises:

a straight running rail of the fixed frame in the lower region of the window or the door;

a carriage with a roller that is movable on the running rail, the carriage having a sash part mounted on the sash and a roller part having the roller, wherein the roller part is movable transversely to the running rail in a straight line relative to the sash part in order to move the sash towards the fixed frame or away from the fixed frame;

an actuatable drive rod, wherein the drive rod is guided in a first groove of the sash;

a control arm which is supported directly or indirectly on the fixed frame;

wherein the window or the door comprises:

i) a slot on the control arm and a pin on the drive rod guided in the slot; and/or ii) a slot on the drive rod and a pin on the control arm guided in the slot;

wherein the slot has control flanks on both sides in its longitudinal direction, wherein a displacement of the pin in the slot in a first direction causes the sash to be detached in a positively controlled manner from the fixed frame and a displacement of the pin in the slot in a second direction opposite to the first direction causes the sash to be pulled towards the fixed frame in a positively controlled manner;

wherein the window or door has a support part arranged or formed on the control arm, wherein the support part is directly connected to the fixed frame, and wherein the support part is configured to introduce the force for detaching the sash from the fixed frame and pulling the sash towards the fixed frame.

2. The window or the door according to claim 1, wherein the roller part is connected to the control arm via a connector.

3. The window or the door according to claim 2, wherein the connector has a hinge.

4. The window or the door according to claim 2, wherein the connector has an adjustment option wherein a first end of the connector, which is arranged on the control arm, is vertically and/or horizontally adjustable with respect to a second end of the connector, which is arranged on the roller part.

5. The window or the door according to claim 3, wherein the connector has an adjustment option wherein a first end of the connector, which is arranged on the control arm, is vertically and/or horizontally adjustable with respect to a second end of the connector, which is arranged on the roller part.

6. The window or the door according to claim 1, wherein the carriage has a projection on both sides of the running rail in order to prevent derailment of the carriage when the sash is loaded transversely to the running rail.

7. The window or the door according to claim 1, wherein the control arm is pivotally mounted on the sash.

8. The window or the door according to claim 1, wherein the roller part is arranged parallel to the first groove.

9. The window or the door according to claim 1, wherein the sash has a second groove running at least partially parallel to the first groove, the carriage being arranged in the second groove.

10. The window or the door according to claim 1, wherein the window or the door has an additional carriage and/or an additional roller part which is/are arranged parallel to the drive rod next to the carriage/roller part.

11. The window or the door according to claim 1, wherein the sash has on its upper side an upper side drive rod guided in an upper side groove of the sash and an upper side control arm which is actuatable by the upper side drive rod and which is supported directly or indirectly on the fixed frame.

12. The window or the door according to claim 11, wherein the upper side drive rod is designed to be identical or mirrored to the drive rod and/or the upper side control arm is designed to be identical or mirrored to the control arm.

13. A window or a door having a fixed frame and a sash movable relative to the fixed frame, wherein the window or the door comprises:

a straight running rail of the fixed frame in the lower region of the window or the door;

a carriage with a roller that is movable on the running rail, the carriage having a sash part mounted on the sash and a roller part having the roller, wherein the roller part is movable transversely to the running rail in a straight line relative to the sash part in order to move the sash towards the fixed frame or away from the fixed frame;

an actuatable drive rod, wherein the drive rod is guided in a first groove of the sash;

a control arm which is supported directly or indirectly on the fixed frame;

wherein the window or the door comprises:

i) a slot on the control arm and a pin on the drive rod guided in the slot; and/or ii) a slot on the drive rod and a pin on the control arm guided in the slot;

wherein the slot has control flanks on both sides in its longitudinal direction, wherein a displacement of the pin in the slot in a first direction causes the sash to be detached in a positively controlled manner from the fixed frame and a displacement of the pin in the slot in a second direction opposite to the first direction causes the sash to be pulled towards the fixed frame in a positively controlled manner;

wherein the roller part is connected to the control arm via a connector;

wherein the connector has an adjustment option wherein a first end of the connector, which is arranged on the control arm, is vertically and/or horizontally adjustable with respect to a second end of the connector, which is arranged on the roller part.

14. A window or a door having a fixed frame and a sash movable relative to the fixed frame, wherein the window or the door comprises:

a straight running rail of the fixed frame in the lower region of the window or the door;

a carriage with a roller that is movable on the running rail, the carriage having a sash part mounted on the sash and a roller part having the roller, wherein the roller part is movable transversely to the running rail in a straight line relative to the sash part in order to move the sash towards the fixed frame or away from the fixed frame;

an actuatable drive rod, wherein the drive rod is guided in a first groove of the sash;

a control arm which is supported directly or indirectly on the fixed frame;

wherein the window or the door comprises:

i) a slot on the control arm and a pin on the drive rod guided in the slot; and/or ii) a slot on the drive rod and a pin on the control arm guided in the slot;

wherein the slot has control flanks on both sides in its longitudinal direction, wherein a displacement of the pin in the slot in a first direction causes the sash to be detached in a positively controlled manner from the fixed frame and a displacement of the pin in the slot in a second direction opposite to the first direction causes the sash to be pulled towards the fixed frame in a positively controlled manner;

wherein the sash has a second groove running at least partially parallel to the first groove, the carriage being arranged in the second groove.

* * * * *